United States Patent [19]
Newman et al.

[11] Patent Number: 5,940,472
[45] Date of Patent: Aug. 17, 1999

[54] INTELLIGENT SERVICES NETWORK TEST SYSTEM

[75] Inventors: Craig E. Newman, Wylie; Brian S. Badger, Dallas, both of Tex.

[73] Assignee: MCI Communications Corporation, Washington, D.C.

[21] Appl. No.: 08/766,987

[22] Filed: Dec. 16, 1996

[51] Int. Cl.$^6$ .............................. H04M 1/24; H04M 3/08; H04M 3/22
[52] U.S. Cl. .................................. 379/1; 379/9; 379/10; 379/32
[58] Field of Search ................................. 379/1, 6, 9, 10, 379/14, 15, 18, 23, 28, 29, 31, 32, 34

[56] References Cited

U.S. PATENT DOCUMENTS

| | | | |
|---|---|---|---|
| 5,359,646 | 10/1994 | Johnson et al. | 379/27 |
| 5,418,845 | 5/1995 | Reeder | 379/34 |
| 5,572,570 | 11/1996 | Kuenzig | 379/1 |
| 5,633,909 | 5/1997 | Fitch | 379/10 |
| 5,809,108 | 9/1998 | Thompson et al. | 379/27 |

FOREIGN PATENT DOCUMENTS

WO 96/16516  5/1996  WIPO .............................. H04Q 3/00

OTHER PUBLICATIONS

Dragoni, et al., "Intelligent Network Service Testing", *Intelligent Newworks: The Pathe To Global Networking, Proceedings of the International Council for Computer Communication Intelligent Networks conference*, May 4–6, 1992, pp. 92–102.

Johnson, M.A. and T.J. Zebo, "New Service Testing Functions for Advanced Intelligent Networks", *Proceedings of the Network Operations and Management Symposium*, Apr. 6–9, 1992, vol. 3, No. 1, pp. 709–720.

Moharram, O.E. and D. Coombs, "Service Maintenance and Testing Strategy for Advanced Intelligent Network", *Proceedings of the Network Operations and Management Symposium*, Feb. 14–17, 1994, vol. 2, No. 4, pp. 609–622.

Takahashi et al., "AIN Surveillance and Testing System Structure and Functions", *Proceedings of the Network Operations and Management Symposium*, Apr. 6–9, 1992, vol 2, No. 1, pp. 510–519.

Wang, C.M. and S.E. Watson, "AIN Operations: Changing the Perspective to Better Support Services", *Proceedings of the Network Operations and Management Symposium*, Apr. 6–9, 1992, vol. 2, No. 1, pp. 600–610.

Copy of PCT International Search Report, Jun. 29, 1998.

*Primary Examiner*—Curtis A. Kuntz
*Assistant Examiner*—Binh K. Tieu

[57] ABSTRACT

A telecommunication services test system which can be used to automatically test services that include intelligent network elements such as automated response units, and manual network elements such as manual operator consoles and the like. The test system provides a means to automate test cases for services that previously could not be automated due to the requirement of human interaction. A controller is coupled with a call generator. The call generator includes a voice means. Accordingly, the controller can response to ARUs and the like with vocal responses. The controller is also coupled with operator services, including manual operator consoles and ARUs, with a two way communication means. The communication means is used to receive status messages from the operator service devices. In addition, the communication means is used to send input messages to the operator service devices. Accordingly, the system provides a means to control manual operator consoles in response to messages sent by the controller. Similarly, the system provides a means to monitor the progress of test calls by receiving status messages from ARUs and operator console devices. In addition, the test system provides a means to verify billing records within the telecommunications network.

9 Claims, 4 Drawing Sheets

INTELLIGENT SERVICES NETWORK TEST SYSTEM

BACKGROUND OF THE INVENTION

1. Field of the Invention

The present invention relates generally to telecommunication test systems and more specifically to an automated telecommunication test system for testing any component of telecommunication networks that include intelligent network elements such as automated response units and manual network elements such as manual operator consoles.

2. Related Art

Testing telecommunication services can be a laborious and time consuming task. This is especially true in today's environment where a wide variety of new telecommunication services are being deployed on a rapid basis. Further, the increased use of intelligent network elements including automated response limits or devices such as audio response units (ARUs), and intelligent switches such as automatic call distributors, complicate the task of testing new telecommunication services. Telecommunication services are typically tested and re-tested at various stages throughout the development process.

For example, as new services are being developed they are typically modified and refined on a frequent basis. The modifications are generally based on several factors including marketing studies, customer feedback, hardware and software design changes, and network element changes. To implement such modifications during the development cycle, product development organizations modify the software which drives the various network elements used to support the new service. The modified software versions are then released to testing organizations who are responsible for verifying the functionality and performance of the new service. Accordingly, during a typical product development cycle, many different software versions may be released to the testing organizations as the features and function of the new service evolve.

Thus, testing organizations typically perform many iterations of various test activities to verify that new services operate as designed and do not adversely affect existing telecommunication services. The dynamic nature of the development of new services, and the time-to-market pressures imposed upon the telecommunications industry, drive the need for timely and efficient test procedures.

Often these requirements are met by automating test procedures. Once test cases are automated they can be repeated with minimal effort. This facilitates regression testing, which verifies common features among different software versions. In addition, automated test cases are generally more reliable than manual test cases due to the reduction of human factor errors. Further, automated test systems are more efficient and reliable because they execute test cases repeatedly in exactly the same manner.

However, in order to gain maximum benefit from automation, test cases should be designed to be executed without human interaction. This not only reduces test staff requirements, but enables one to run test cases continuously during the day or night. In order for test cases to run unattended, they must be able to verify the correct operation of telecommunication services and they must be able to detect errors when they occur. Typically, test cases are designed to accomplish this by dynamically comparing the test case results against predefined expected results. Alternatively, test cases can be programmed to generate test result logs or the like, which can be analyzed at a later time.

In addition, in order for test cases to run unattended, the telecommunication service under test must not require human interaction. For example, telecommunication services such as voice mail systems, automated collect call services and the like, generally require human interaction. Human interaction can be in the form of speech and/or telephone keypad input. As such, testing these types of telecommunication services are conventionally performed manually.

Another difficulty arises when testing telecommunication services that include the use of manual operation. Typically such services involve human operators interacting with customers from manual operator consoles. The very nature of such human interaction makes the testing of such service inherently difficult to automate. Thus, these types of services are also conventionally tested manually.

SUMMARY OF THE INVENTION

Accordingly, the present invention is directed towards an automated telecommunications test system for testing telecommunication networks that include intelligent network elements such as automated response units, and manual network elements such as manual operator consoles. The test system can be used to test services in an automated fashion, that have traditionally been very difficult or impossible to automate due to the requirement of human interaction.

The system of the present invention comprises a means for communication between a test call controller and one or more intelligent service platforms within an intelligent services network (ISN), such as operator network centers (ONCs), and the like. ONCs are used to provide human and automated operator services to customers through the user of manual operator consoles, and ARUs. The test system of the present invention provides two way communications between the network elements within ONCs and the test call controller. The communication means is used to facilitate automation of test calls for products that use such operator services.

For example, the communication means of the present invention can be used to send keyboards to a manual operator console. The keystrokes sent during a test call are received by the manual operator console and used as input to the console. In this manner, the controller emulates a live operator typing keystrokes into an operator console.

Similarly, the communication means of the present invention can be used to send status information from the manual operator console to the controller. In this manner, the controller receives the same information as a live operator would receive from the console's display screen. This includes caller information, such as a caller's name or the called number, as well as signaling information such as call ringing, call answering, etc.

In a similar fashion, the controller of the present invention receives status information from ARUs. Such information includes for example the identification of a particular vocal script that is being played to a caller, or status information such as call received and call ringing messages.

In a preferred embodiment, the communication means comprises a message protocol such as the User Datagram Protocol/Internet Protocol (UDP/IP). Both the controller of the present invention and each element within the ONC contain UDP/IP communication components.

The system of the present invention also comprises a test call generator used to generate test calls in the communication network. The test call generator is controlled by the controller according to instructions in a test call script. The test call script also provides the commands pertaining to the previously mentioned two way communication means between the controller and the various elements within the ONC.

In addition, the system of the present invention comprises a means for verifying billing records within the telecommunication network. The controller of the present invention creates a billing template that comprises expected billing information for each test call. The billing template is then compared against data from a billing verification system that reflects actual billing results from the communications network.

The controller of the present invention also comprises an audio generation and capturing device. This device is used to generate speech output and/or capture speech input. The speech capabilities of the present invention are used to interact with telecommunication services under test in an automated fashion. Thus, for example, the controller may cause the audio generator to generate a particular speech signal in response to a particular script from an ARU.

Accordingly, the present invention provides a means for automated test cases to interact, in an unattended fashion, with telecommunication products that use intelligent network services such as operator network centers and the like.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

The present invention provides a system and method for automating the testing of telecommunication services that are traditionally difficult or impossible to automate. The system of the present invention comprises a means for communication between a test call controller and one or more intelligent service platforms within an ISN such as an ONC, an automated facsimile service, a call forwarding service, and the like. ONCs are used throughout in the examples below in order to distinctly point out novel and unique aspects of the present invention. However, other ISN platforms can also be used to implement the present invention. As such, ONCs are used for exemplary purposes and should not be construed to limit the scope and breadth of the present invention.

Figure 1:
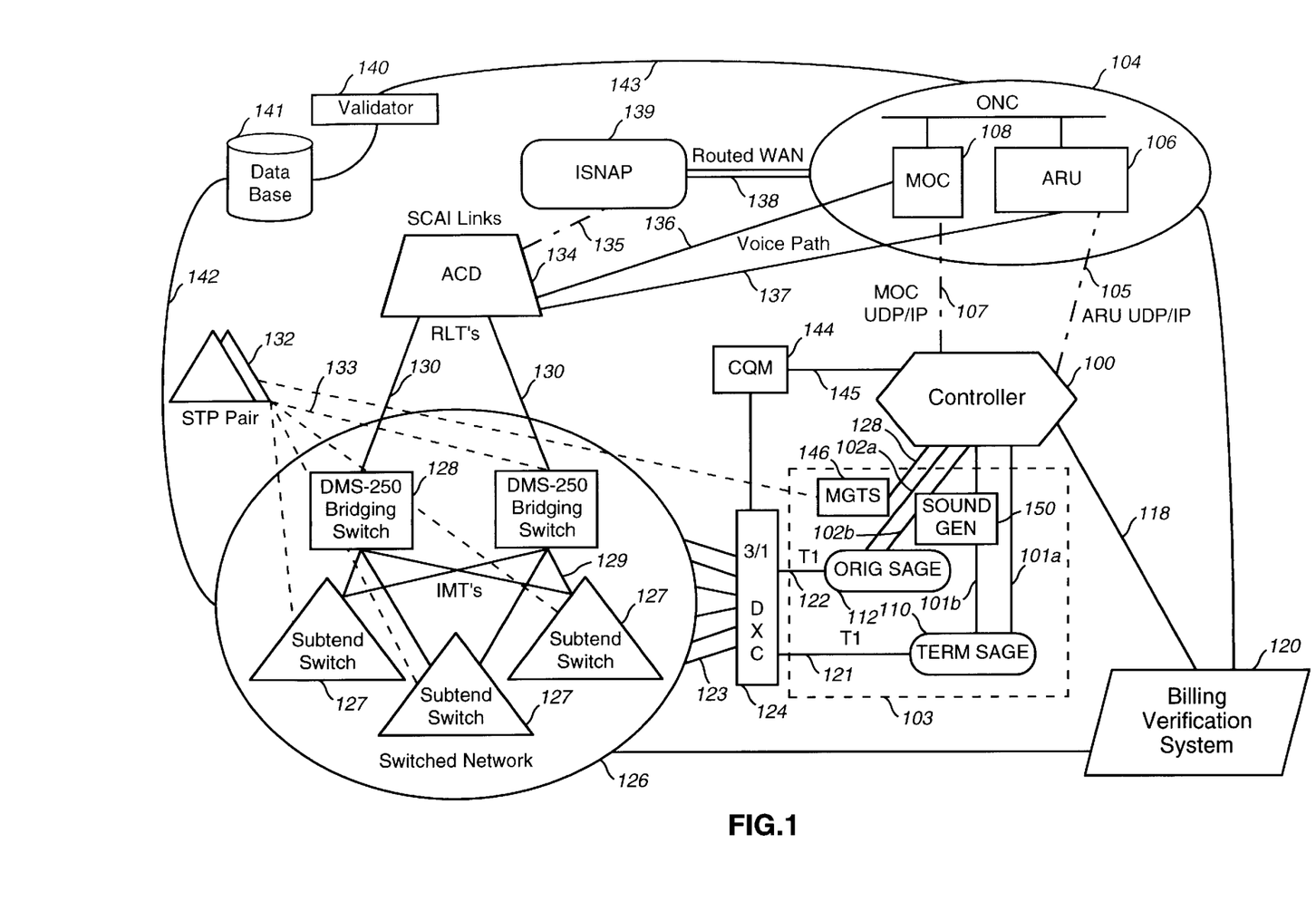
FIG. 1 is a block diagram depicting a preferred embodiment of the present invention in a typical operating environment.

FIG. 1 is a block diagram depicting a preferred embodiment of the present invention in a typical operating environment. First, the interconnection of the elements comprising the test system is described. This is followed by a general functional summary of each element. Finally, a more detailed description of each element is presented.

The test system depicted in FIG. 1 comprises a controller 100 and a call generator 103. The controller 100 is coupled to an operator network center (ONC) 104 via a pair of bi-directional communication channels 107 and 105. The call generator 103 is coupled with a 3/1 digital cross connect (DXC) 124 via a pair of T1 communication lines 122 and 121. The DXC 124 is coupled with a switched network 126 via a plurality of T1 transmission lines 123. The switched network 126 is coupled with an signal transfer point (STP) pair 132, an automated call distributor (ACD) 134, a data base 141 and a billing verification system 120. The STP pair 132 is also connected to the controller 100 through an out-of-band testing device 146.

ACD 134 is coupled with one or more operator network centers (ONC) 104 (not shown), via voice channels 136 and 137. The ACD 134 is also coupled with the switched network 126 via two release link trunks (RLTs) 130. The ONC 104 comprises a manual operator console (MOC) 108 and an audio response unit (ARU) 106. An Intelligent Services Network Adjunct Processor (ISNAP) 139 is coupled between the ONC 104 and the ACD 134. The ISNAP 139 is connected to the ACD 134 via one or more switch to computer application interface (SCAI) links 135. Additionally, the ISNAP 139 is coupled with the ONCE 104 via a routed wide area network (WAN) 138.

A billing verification system 120 is coupled with the switched network 126, the ONC 104 and the controller 100. A validator 140 is coupled between the ONC 104 and the database 141.

A general summary of the functionality of each element will now be described. The controller 100 is used to execute and control test calls within the test system depicted in FIG. 1. In a preferred embodiment, the controller 100 is a general purpose computer system running software that functions according to the descriptions contained herein. The computer system executes test calls according to predefined instructions within test call scripts (not shown). Typically, such test call scripts are stored and retrieved to and from a data base system (not shown) by the controller 100. An exemplary computer system that can be used as the controller 100 will be subsequently described herein with reference to FIG. 4.

The test call generator 103 generates test calls according to commands from the controller 100. The test call generator also receives test calls from the switched network 126. The DXC 124 functions to connect particular T1 trunks 123 from the switched network 126, with the T1 transmission lines 121 and 122.

The ONC 104 provides manual and automated operator services. Specifically, the ONC comprises a manual operator console (MOC) 108 and an audio response unit (ARU). These systems simulate the operator services that are provided to customers in an actual telecommunications network. However, unlike the actual network, the MOCs 108 are unmanned. The controller 100 communicates with the MOC 108 and the ARU 106 via the UDP/IP communication links 107 and 105 respectively. For example, the controller 100 receives status messages from the ARU such as call received messages and the like, via the UDP/IP link 105. Similarly, the controller 100 sends keystroke commands to the MOC 108 via messages over the UDP/IP link 107. Note that the use of UDP/IP protocol is an example of a preferred means for communication between the controller 100 and the ONC 104. A variety of different means for communication can be also be used without departing from the principles disclosed herein. As such, the use of this example should not be construed to limit the breadth and scope of the present invention.

The ACD 134 is used to route calls from the switched network 126 to a particular operator group or a particular ARU. For example, in an actual network, calls that are destined to operators that speak a foreign language are routed by the ACD 134 to a specific operator group having operators that speak the foreign language. Similarly, calls that are destined to a particular service that resides in a particular ARU are routed to that particular ARU by the ACD 134. Note that in addition to selecting a particular MOC 108 or ARU 106, the ACD 134 typically handles queuing of incoming calls when ONCs are busy processing other incoming calls.

Once a particular MOC 108 or ARU 106 is selected by the ACD 134, voice data for the call is carried over one of the voice path transmission lines 136 or 137. Signaling data between the ACD 134 and the ONC 106 is routed over the SCAI links 135 to the ISNAP 139. From there, the ISNAP 139 translates the SCAI protocol signaling data into UDP/IP data. The UDP/IP data is then routed to the appropriate element within the ONC 104, via the routed WAN 138, according to routing information supplied by the ACD 134. Similarly, UDP/IP signaling data from the ONC 104 is sent over the routed WAN 138 to the ISNAP 139. This data is then translated by the ISNAP 139 into SCAI protocol data and routed to the ACD 134 via the SCAI links 135.

The ACD 134 sends and receives signaling data to and from the switched network 126 via the RLTs 130. Such signaling data is transmitted using system signaling 7 (SS7) protocol. One of the functions of the ACD 134 is to act as the interface between the telephony devices in the switched network 126 and the computer devices in the ISN. That is, the ACD 134 translates the SS7 data originating from the telephony devices within the switched network 126 into SCAI protocol data for the computer devices within the ISN, and vice-versa.

The STP pair 132 is used to transmit SS7 signaling data directly to each switch 128 and 127 via the SS7 connections 133 for out-of-band test calls. Note that a pair is reference herein to indicate that there are typically two SS7 links 133 for each switch 128 and 127. Two links are typically used for redundancy purposes.

The validator 140 is used by the elements within the ONC 104 to validate caller data, such as credit card information and the like. For example, an automated service that accepts credit card calls within the ARU 106, may use information provided by the validator 140 to validate credit card numbers. Other caller data such as the calling number identification data and the like may be used to validate calls as well.

The data base 141 is used for various network related activities, such as dynamic routing for toll-free calls, ARU calls and the like. For example, a switch within the switched network 126 that receives an 800 telephone number, must resolve that number into one that contains necessary routing information. For illustrative purposes, suppose the service 1-800-COLLECT® resides within the ARU 106. The receiving switch (such as the switch 127), accesses the data base 141, so that the 800 telephone number is translated into a number that corresponds with the address of the ACD 134. The ACD 134 then routes the call to the ARU 106 that provides the 1-800-COLLECT® service.

The billing verification system 120 is used by the controller 100 to verify billing records for test calls, via the transmission line 118. The billing verification system 120 is a central database that contains billing information for the test network depicted in FIG. 1. In this example, all billing records are consolidated and recorded in the billing verification system 120. The controller creates a billing template for each test call in which real-time billing verification is desired. The template contains information that is based on expected billing data. The template is based on parameters such as the test call connection time, etc. After a test call is complete, the controller 100 communicates with the billing verification system 120 to compare the billing records contained therein with the billing template. A log is generated based on the results of that comparison.

A more detailed description of the elements of the test system will now be described with particular focus on the unique features of the present invention. The call generator 103 comprises a pair of in-band T1 testing devices 110 and 112, an out-of-band testing device 146, and a sound generator 150. In this example, as in a preferred embodiment of the present invention, the pair of T1 test devices 112 and 110 are common off the shelf (COTS) in-band test sets. An example of such a test set is a SAGE Instruments 930A Communication Test set, manufactured by SAGE Instruments. Alternatively, any type of in-band call generator can be used without departing from the principles of the present invention.

In this example, the SAGE devices 112 and 110 function as a test call generator and test call originator, respectively. Each test call generator is coupled with the switched network 126, via a T1 transmission line (122 or 121) coupled through the 3/1 DXC 124. In this example, remote operation of the DXC 124 is accomplished through the use of a configuration queue manager (CQM) 144. The CQM 144 is used to coordinate resource requests from multiple contending test platforms (not shown), and to allocate the use of network resources among such platforms. For a complete description of the CQM 144, please refer to U.S. Patent Application by Brian S. Badger and Craig E. Newman entitled "A System and Method for Providing Resources to Test Platforms," attorney docket no. RIC-95-064 (1575.1300000), filed on Sep. 26, 1996, which is hereby incorporated by reference in its entirety.

Note that for test environment using multiple test platforms, the preferred method for controlling the DXC 124 is through the use of the CQM 144. However for simplicity, in the examples used herein, an environment comprising a single test platform is described. In such an environment, the function provided by the CQM 144 is not required. As such, the function of the CQM 144 is not described herein. For purposes of this disclosure, any method can be used to control and configure the DXC 124. Such methods are well known and would be apparent to those skilled in the relevant art(s).

The originating SAGE 112 is connected with a serial line 102a to the serial port (not shown) of the controller 100. Likewise, the terminating SAGE 110 is connected with a serial line 101a to the serial port (not shown) of the controller 100. The controller 100 controls the actions of each SAGE device via these serial connections. As shown, the SAGE device 112 functions as a call originator and the SAGE device 110 functions as a call terminator. That is, the call originator 112 originates test calls that terminate at the call terminator 110. Once a connection is established between the originator 112 and the terminator 110, communications can occur in both directions simultaneously.

The call generator 103 also comprises an out-of-band testing device 146. An example of such a device is a Message Generation Traffic Simulator (MGTS) by TEKELEC. For out of band calls the MGTS 146 performs the signaling for both the originating and terminating side of the call via SS7 Messaging protocol. Accordingly, the MGTS 146 is coupled to the STP pair 132.

A particular advantage of the present invention is that by including both in-band and out-of-band test devices, test calls can be originated and terminated using either in-band and out-of-band signaling techniques. For example, a test call can originate using in-band signaling and terminate using either in-band or out-of-band signaling. Similarly, a test call can originate using out-of-band signaling, and terminate using either in-band or out-of-band signaling.

The sound generator 150 is coupled between the controller 100 and each SAGE device 122 and 110, via bidirectional transmission line pairs 101b and 102b. The sound generator 150 may comprise for example, a COTS sound card coupled to an interface device (not shown). For a detailed description of such a device please refer to U.S. Patent Application by Craig E. Newman, entitled "Audio Interface for Telecommunications Test system," attorney docket No. RIC-95-062 (1575.129) filed on Sep. 26, 1996, which is hereby incorporated by reference in its entirety. As described below, the sound generator 150 is used to input human voice responses for the ARU 106. In addition, the sound generator 150 can be used to record and store vocal data originating from the ARU 106.

Thus, the sound generator 150 is used to generate voice response to ARUs during test calls. For example the controller 100 directs the sound generator 150 to utter "hello" when a 1-800-COLLECT® call is answered by the terminating SAGE 110. Similarly, the controller 100 can direct the sound generator 150 to say a name in response to the ARU's vocal request to "state your name."

The switched network 126 comprises 3 subtend switches 127. An example of a subtend switch is a DEX-600E manufactured by DSC Communications Corporation. In addition, the switched network 126 comprises 2 bridging switches 128. An example of a bridging switch is a DMS-250 switch manufactured by Nortel, Inc. Many other types and configurations of switches within the switched network 126 can be used. In this example, each switch is connected to every other switch by an Intermachine Trunk (IMT) 129. An STP pair 132 provides a path for the SS7 Messaging between each switch 128 and 127 via the transmission lines 133.

In a preferred embodiment, the ACD 134 is a modified Nortel DMS-100 switch that contains customized software for automatic call distribution. The ACD 134 receives calls from a bridging switch 128 via the RLTs 130. The RLTs 130 allow the ACD 134 to release trunks in a backward direction to eliminate the ACD 134 from the call path when desired. Calls are released from the ACD 134 and bridged in the bridging switch 128 thereby increasing the volume of traffic that the ACD 134 can handle.

As stated, the controller 100 communicates with the elements in the ONC 104, via the UDP/IP communication lines 105 and 107. Thus, each element in the ONC 104 (or any other ISN platform that is to be tested with an embodiment of the present invention), must be pre-configured with communication means according to the principles of the present invention. In a preferred embodiment, software to implement the communication means is not only installed in test elements, but also in all production units of the network elements that are tested with the present invention. In this manner, unique software which is not present in the actual network, need not be introduced into a test network environment. As should be appreciated, it is desirable to have a test network that is as similar as possible to the actual revenue bearing telecommunications network. Introducing unique software into a test network only tends to add extraneous variables not present in the actual network and may render unreliable and unrealistic results. Further, by embedding such software in all production models, an embodiment of the present invention can be used to test the actual communications network simply by putting the desired network element into a "test mode" as described below.

As stated in a preferred embodiment, a UDP/IP protocol is used to implement the means for communicating between the controller 100 and the ONC 104. A detailed example of a UDP/IP protocol referred to as "FATCAT" protocol, according to a preferred embodiment of the present invention, is presented in the Appendix below.

Figure 2:
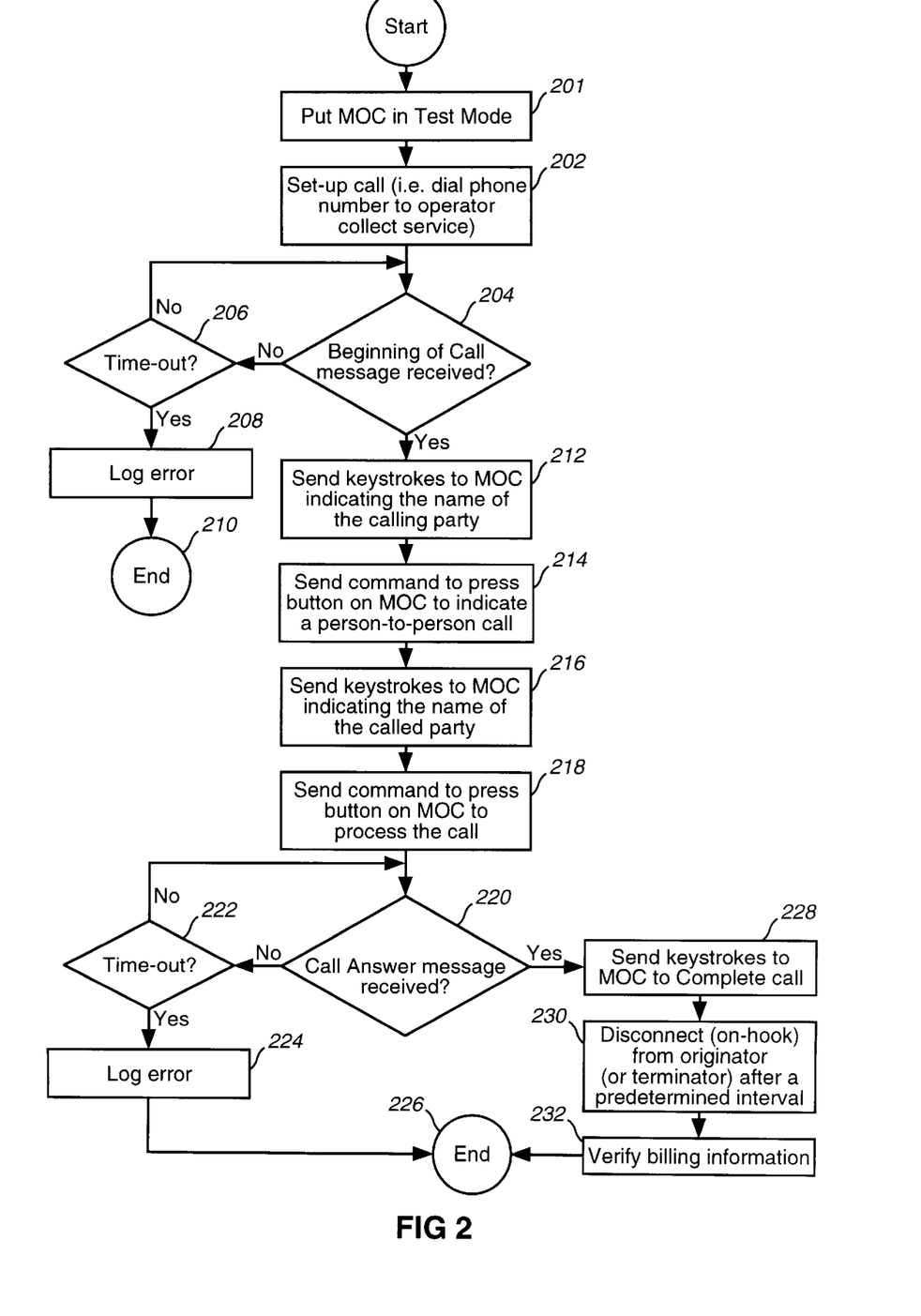
FIGS. 2 and 3 are flow charts depicting a typical test case that can be used with an embodiment of the present invention.

A typical test call that can be executed using the present invention will now be described with reference to FIG. 2. The test call in this example demonstrates the testing of a manual operator assisted collect person-to-person call. The test call begins with step 201. In step 201, the MOC 108 is placed in a test mode. The controller 100 sends an "MOC test mode" message to the MOC 108 via the communication line 107. This causes the MOC 108 to put itself in testing mode, to prepare for the receipt of automation instructions from the controller 100, and to provide status information to the controller about call processing events. When the test mode message is received, the MOC 108 sends back a test mode acknowledge message to the controller 100. Next control passes to step 202.

Note that all messages sent to the ARU 106 and MOC 108 have an associated acknowledge message. Typically, after the controller 100 sends a message to the ARU 106 or the MOC 108, it waits for an acknowledge message before continuing with the test call. If an acknowledge message is not received within a predetermined amount of time, the message is typically re-sent by the controller 100 at periodic intervals. This is typically repeated until a time-out period has expired, which may indicate a catastrophic error within the test network.

Next, in step 202, the test call is set-up by the call generator 103. For in-band test calls, the controller 100 sends a command to the originating SAGE 112 via the serial connection 102a. The command generally involves directing the SAGE 112 to dial a particular telephone number that is associated with the particular service under test. Alternatively, for an out-of-band originating test call, the MGTS 146 is used to set up the call using an SS7 IAM (Initial Address Message) directed to the STP pair 132. The STP pair 132 communicates to the switched network 126 via the STP transmission lines 133, to set-up the call to the collect call service. In any case, the commands and the protocol necessary to control the SAGE 112 and/or the MGTS 146 are specified by the test device manufacturer and are constrained by the configuration of the test network. As such, the command and protocol structure will be apparent to those skilled in the relevant art(s).

In this example, the particular service under test is an operator assisted 1-800-COLLECT® call service. Once the test call is set up, a voice connection is established between the originating SAGE 112 and the MOC 108. Note that even for out-of-band test calls, the SAGE 112 may still be used to provide input over the voice channel. For example, a test call to an automated collect call service within the ARU 106 may require input over the voice channel. Such input is typically in the form of one or more Dual Tone Multi-Frequency (DTMF) signals and/or voice responses. The voice signals are originated by the sound generator 150, and delivered to the switched network through one of the SAGE devices 110 or 112. The DTMF signals are provided by directly controlling either SAGE device 110 or 112 to generate such signals.

Next, in step 204, the controller 100 waits for a "beginning of call" message from the MOC 108. In step 206, the controller determines if a time-out period has expired. An expired time-out period in step 206 indicates that a problem in the test network is preventing the execution of the test call. Thus, as steps 208 and 210 indicates, an error message is logged and the process ends.

Once a "beginning of call" messages is received, the process continues with step 212. In step 212 the controller sends a "logrec" message to the MOC 108. The "logrec" message contains keystrokes to be input into the MOC 108. In this case, the keystrokes represent the calling party's name. Note that in an actual operator assisted call, the operator asks a for the caller's name and types it into the MOC 108. Step 212 emulates this manual step without human interaction.

In step 214, another "logrec" message is sent to the MOC 108. In this case, the "logrec" message directs the MOC 108 to press a particular button on the console that indicates a person-to-person call is desired. During an actual operator assisted call, pressing this button causes a script to be displayed to the operator. The script prompts the operator to ask the caller the namer of party being called.

Next in step 216, a "logrec" message is sent to the MOC 108 to indicate the name of the called party that is the recipient of the person-to-person collect call. This simulates the step where an operator types in the name of the called party into the operator console.

Next in step 218, a "logrec" message is sent to the MOC 108 to process the call. Note that the telephone number of the called party has already been relayed to the MOC 108 during the initial answering of the call, via the SCAI links 135 and the routed WAN 138.

In step 220, the controller waits for the MOC to send a message indicating that the call has been answered. In this example, the call is answered when the terminating SAGE 110 responds to an incoming call by going off-hook. This causes signaling data to be transmitted from the switched network 126, to the ACD 134, via the RLTs 130. The ACD translates the signaling data into an SCAI message via the SCAI links 135. The ISNAP 139 receives the SCAI message, translates it to a UDP/IP message (in this case, a call answered message), and sends it to the MOC 108, via the routed WAN 104. Finally, because the MOC 108 is still in test mode, it sends a "logrec" message to the controller 100 to indicate that the call has been answered.

As steps 222 and 224 indicate, if the call answered message in step 220 has not been received after a time-out period has expired, an error is logged and the test call ends. If the expected call answered message is received in step 220, control passes to step 228.

Next, in step 228 the controller sends a "logrec" message to the MOC 108 to complete the call. This step causes the ACD 134 to send a message to the bridging switch 128 to connect or "bridge" the originating and terminating connections together, and to disconnect the ACD 134 from the bridged call.

Next in step 230, after a predetermined interval of time, the controller sends a command to the terminating SAGE 110 to go on-hook in order to end the call. Alternatively, the call could just as easily be terminated by sending an on-hook command to the originating SAGE 112. In either case, the duration of the call is known by the controller 100, so that an expected billing template can be created.

Thus, in step 232, the expected billing template is compared against the billing records from the billing verification system 120. The results are logged accordingly. The test call ends with step 226.

Figure 3:
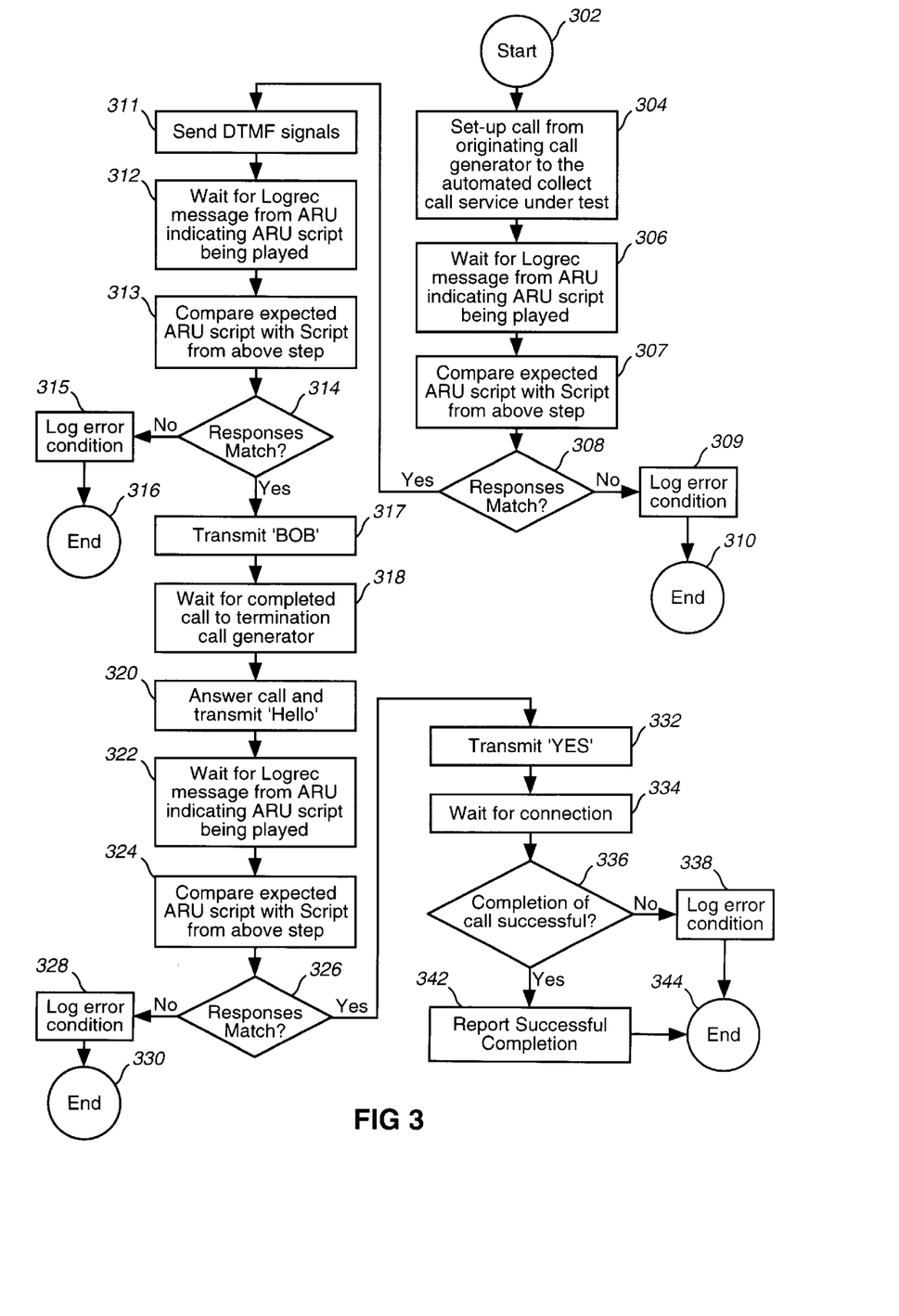

A typical test call using an ARU service that can be executed using the present invention will now be described with reference to FIG. 3. The test call process begins with step 304. In step 304 a call is set up by the originating SAGE 112. Specifically, a command is sent from the controller 100 to the SAGE 112 via the serial connection 102a. Such command generally involves directing the SAGE 112 to dial a particular telephone number that is associated with the service under test, in this case, the ARU 106.

In this example, the particular service under test is an automated collect call service. The test network is set up such that the number dialed by the originating SAGE 112 is routed to the ACD 134. The ACD 134, in turn, routes the call to the ARU 106. Note that the database 141 may be used to resolve the 800 telephone number, as previously described. In any case, the collect call service under test within the ARU 106 responds to the call that is set-up during step 304.

Once the test call is set up, a voice connection is established between the SAGE 112, and the collect call service in the ARU 106, via the T1 transmission lines 122 that is connected to the switched network 126. From there, the call is routed to the ACD via an RLT 130. The ACD routes the call to the ARU 106 via the voice path line 137.

The ARU 106 answers the call with a particular message such as "Please enter the telephone number you wish to call". In step 306, the controller waits for a "Logrec" message from the ARU, via the UDP/IP line 105, which indicates that a script is being plated to the caller.

Next, as step 307 indicates, the expected script is compared against the script from step 306. In step 308 the process determines whether the response from the ARU matches the expected response. In this case, the controller verifies that the script message received by the ARU 106 corresponds with the proper ARU script that states "Please enter the telephone number you wish to call". If the response from the ARU does not match the expected response an error condition is logged in step 309 and the process ends with step 310. If the responses match, control passes to step 311.

In step 311, DTMF signals that represent the telephone number of the collect call is sent by the SAGE 112 to the ARU 106. This is accomplished by the controller 100 sending a command to the SAGE 112 to generate such DTMF signals over the voice path to the ARU 106. In this example, the number that is entered in step 311 represents the telephone number of the terminating call device, the SAGE 110.

The ARU responds with another voice message. In this example, the voice message is "Please say your name after the tone". In step 312, the controller waits for a "Logrec" message from the ARU 106 which indicates that a script is being plated to the caller.

Next, as step 313 indicates, the expected script is compared against the script from step 312. In step 314 the process determines whether the response from the ARU 106 matches the expected response. In this case, the expected response is "Please say your name after the tone". Thus, the controller determines whether the script number from step 312 corresponds with the expected ARU response. If the response from the ARU does not match the expected response an error condition is logged in step 315 and the process ends with step 316. If the responses match, control passes to step 317.

In step 317, the sound generator 150 transmits a voice signal to the ARU 106. This is typically accomplished by using a pre-recorded voice file that is stored a that data base (not shown) coupled with the controller 100. Upon a command from the controller 100 the pre-recorded voice file is processed by the sound generator 150. The sound generator 150 generates a voice signal that is transmitted to the ARU 106.

In step 318 the process waits for an indication that a call has been completed by the ARU. For example, the controller 100 waits for a status message from the ARU that indicates that a call has been answered by the terminating SAGE 110, as described above. Once it is determined that the call has been answered, the controller directs the sound generator 150 to say "hello", as step 320 indicates.

Next, in step 322, the controller 100 waits for another "Logrec" message from the ARU 106 to indicate a voice response script is being played by the ARU 106. In this example, the voice response is "Hello, this is an automated operator. You have a collect call from Bob in Colorado Springs, Colo. If you wish to accept this call please say YES. If you do not wish to accept this call please say NO." In step 324 this script is verified in the same manner as described above. If the response from the ARU does not match the expected response an error condition is logged in step 328 and the process ends with step 330. If the responses match control passes to step 332.

In step 332 the sound generator 150 is directed to transmit "YES" to the ARU 106. This response should cause the ARU 106 to complete the call. Thus, in step 334 the process waits for the connection between the originating SAGE 112 and the terminating SAGE 110. As stated, this occurs when the bridging switch 128 bridges the two connections together and releases the ARU 106 from the call.

Next in step 336, the process determines whether the connection from step 334 has been successfully completed. Typically this is accomplished by sending a tone from the originating SAGE 112 and verifying that the tone is received by the terminating SAGE 110. If the connection has been successfully completed, positive results are reported in a log. If not, an error is reported. In either case, the process ends with step 344.

Figure 4:
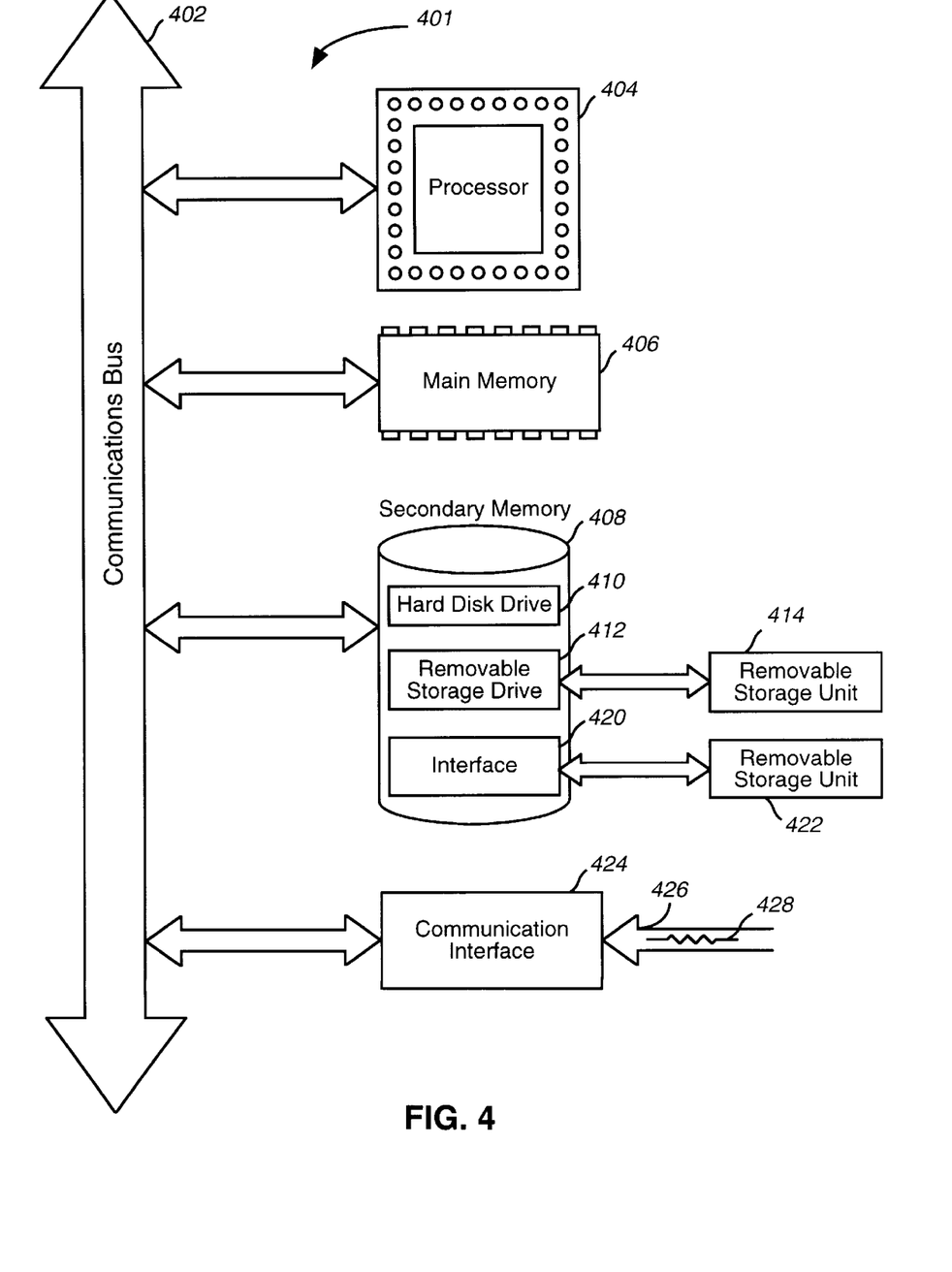
FIG. 4 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 401 is shown in FIG. 4. The computer system 401 includes one or more processors, such as processor 404. The processor 404 is connected to a communication bus 402. Various software embodiments are described in terms of this example computer system. After reading this description, it will become apparent to a person skilled in the relevant art how to implement the invention using other computer systems and/or computer architectures.

Computer system 401 also includes a main memory 406, preferably random access memory (RAM), and can also include a secondary memory 408. The secondary memory 408 can include, for example, a hard disk drive 410 and/or a removable storage drive 412, representing a floppy disk drive, a magnetic tape drive, an optical disk drive, etc. The removable storage drive 412 reads from and/or writes to a removable storage unit 414 in a well known manner.

Removable storage unit 414, represents a floppy disk, magnetic tape, optical disk, etc. which is read by and written to by removable storage drive 412. As will be appreciated, the removable storage unit 414 includes a computer usable storage medium having stored therein computer software and/or data.

In alternative embodiments, secondary memory 408 may include other similar means for allowing computer programs or other instructions to be loaded into computer system 401. Such means can include, for example, a removable storage unit 422 and an interface 420. Examples of such can include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 401.

Computer system 401 can also include a communications interface 424. Communications interface 424 allows software and data to be transferred between computer system 401 and external devices. Examples of communications interface 424 can include a modem, a network interface (such as an Ethernet card), a communications port, a PCMCIA slot and card, etc. Software and data transferred via communications interface 424 are in the form of signals which can be electronic, electromagnetic, optical or other signals capable of being received by communications interface 424. These signals 426 are provided to communications interface via a channel 428. This channel 428 carries signals 426 and can be implemented using wire or cable, fiber optics, a phone line, a cellular phone link, an RF link and other communications channels.

In this document, the terms "computer program medium" and "computer usable medium" are used to generally refer to media such as removable storage device 412, a hard disk installed in hard disk drive 410, and signals 426. These computer program products are means for providing software to computer system 401.

Computer programs (also called computer control logic) are stored in main memory and/or secondary memory 408. Computer programs can also be received via communications interface 424. Such computer programs, when executed, enable the computer system 401 to perform the features of the present invention as discussed herein. In particular, the computer programs, when executed, enable the processor 404 to perform the features of the present invention. Accordingly, such computer programs represent controllers of the computer system 401.

In an embodiment where the invention is implemented using software, the software may be stored in a computer program product and loaded into computer system 401 using removable storage drive 412, hard drive 410 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation.

Thus, the breadth and scope of the present invention should not be limited by any of the above-described exemplary embodiments, but should be defined only in accordance with the following claims and their equivalents.

APPENDIX

FATCAT Protocol

1. Introduction

This document describes the protocol between a FATCAT Test Driver (the controller) and the FATCAT Test Objects (the ARU and the Manual Operator Console).

2. Protocol Features

The FATCAT protocol provides the following features:

- The phone call connecting and disconnecting at the Test Objects is communicated to the Test Driver.
- The Test Driver can synchronize with the Test Object's current state. This ensures that input is sent only when the Test Object is ready for it (otherwise the Test Object discards it), and that originator disconnect is performed by the Test Driver at the fight time.
- Various data, such as the Billing detail record, can be sent from the Test Objects to the Test Driver and saved by the Test Driver.
- Current versions of the Test Objects can be considered to be functioning properly if (1) data from previous versions that should be the same as data from the current versions is the same, and (2) the Test Object get all the way through the expected sequence of states.

3. Message Descriptions

There are the following messages:
1. ARU TESTMODE
2. ARU Beginning of Call
3. ARU End of Call
4. ARU Header Info
5. ARU Logrec
6. ARU Transfer
7. Manual Console TESTMODE
8. Manual Console Beginning of Call
9. Manual Console End of Call
10. Manual Console Header Info
11. Manual Console Logrec
12. Manual Console Synch Notify
13. Manual Console Synched
14. Manual Console State Query
15. Manual Console State Query Response . . . and Acks for each An ARU TESTMODE message (sent from Test Driver to ARU) tells the ARU what mode to be in (None, Read, Create, or Read/Create (aka Both)) and specifies which ARU port to use.

An ARU Beginning of Call message (sent from ARU to Test Driver) specifies that call processing has begun at the ARU.

An ARU End of Call message (sent from ARU to Test Driver) specifies that call processing has ended at the ARU and whether the call has been transferred to a Manual Console. This is not the same as the call disconnecting, for further call processing can occur after that (such as the creation of the BDR).

An ARU Header Infro message (sent from ARU to Test Driver) passes ARU information to the Test Driver for inclusion in the logfile header.

An ARU Logrec message (sent from ARU to Test Driver) contains a logfile record. The Test Driver writes this logfile record to the output logfile.

An ARU Transfer message specifies that the call has been transferred to a Manual Console.

A Manual Console TESTMODE message (sent from Test Driver to Manual Console) tells the Manual Console what mode to be in (None, Read, Create, or Read/Create (aka Both)).

A Manual Console Beginning of Call message (sent from Manual Console to Test Driver) specifies that call processing has begun at the Manual Console.

A Manual Console End of Call message (sent from Manual Console to Test Driver) specifies that call processing has ended at the Manual Console. This is not the same as the call disconnecting, for further call processing can occur after that (such as the creation of the BDR).

A Manual Console Header Info message (sent from Manual Console to Test Driver) passes Manual Console information to the Test Driver for inclusion in the logfile header.

A Manual Console Logrec message (sent from Manual Console to Test Driver, and from Test Driver to Manual Console) contains a logfile record. The Manual Console obtains synch info or a keystroke from a received logfile record. The Test Driver writes a received logfile record to the output logfile.

A Manual Console Synch Notify message (sent from Test Driver to Manual Console) instructs the Manual Console to send a Manual Console Synched message when the Manual Console is synchronized.

A Manual Console Synched message (sent from Manual Console to Test Driver) specifies that the Manual Console is synchronized.

A Manual Console State Query message (sent from Test Driver to Manual Console) prompts the Manual Console to send back a Manual Console State Query Response message.

A Manual Console State Query Response message (sent from Manual Console to Test Driver) gives the current script state of the Manual Console.

4. Message Flows

These messages are sent from the Test Driver to the ARU:
1. ARU TESTMODE.

These messages are sent from the ARU to the Test Driver:
1. ARU Beginning of Call.
2. ARU End of Call.
3. ARU Header Info.
4. ARU Logrec.
5. ARU Transfer.

These messages are sent from the Test Driver to the Manual Console:
1. Manual Console TESTMODE.
2. Manual Console Logrec.
3. Manual Console Synch Notify.
4. Manual Console State Query.

These messages are sent from the Manual Console to the Test Driver:
1. Manual Console Beginning of Call.
2. Manual Console End of Call.
3. Manual Console Header Info.
4. Manual Console Logrec.
5. Manual Console Synched.
6. Manual Console State Query Response.

5. Message Format Summary

The general message format is as follows:

| Field | Type | Len | Value | Description |
|---|---|---|---|---|
| NIDS Header | 8 bytes | 8 | Any | FATCAT uses the NIDS client library to send IP messages. The NIDS client library places its own 8-byte header on the front of each message. This header is not used by FATCAT and is not included in the message length. |
| Length | Unsigned Integer | 2 | 5..n | Message length. Does not include length of NIDS header. At least 5 since that is the size if there is no data field. |
| Sequence Number | Unsigned Integer | 2 | 1..n | Message sequence number, starting at 1 and increasing by 1 for each new message. Not used for Testmode messages since they can occur outside the context of a call and would prevent the user from rebooting or switching to a different Test Object or a different Test Driver. |
| Type | Unsigned Char | 1 | See "*" below. | Message type. This specifies the kind of message. |
| Data (optional) | Bytes | 0..n | Any | This field is optional, and contains any additional data. This includes synch info, BDRs, etc. |

| Message | Regular | Ack |
|---|---|---|
| ARU Testmode | 0x01 | 0x81 |
| ARU Beginning of Call | 0x02 | 0x82 |
| ARU End of Call | 0x03 | 0x83 |
| ARU Header Info | 0x04 | 0x84 |
| ARU Logrec | 0x05 | 0x85 |
| ARU Transfer | 0x06 | 0x86 |
| Manual Console Testmode | 0x41 | 0xC1 |
| Manual Console Beginning of Call | 0x42 | 0xC2 |
| Manual Console End of Call | 0x43 | 0xC3 |
| Manual Console Header Info | 0x44 | 0xC4 |
| Manual Console Logrec | 0x45 | 0xC5 |
| Manual Console Synch Notify | 0x46 | 0xC6 |
| Manual Console Synched | 0x47 | 0xC7 |
| Manual Console State Query | 0x48 | 0xC8 |
| Manual Console State Query Response | 0x49 | 0xC9 |

*The Type field has the following values by message type:

Bit 7 set (0x80) indicates an Ack.

Bit 6 set (0x40) indicates the Manual Console; clear indicates the ARU.

6. Message Format Detail

The format of each message is as follows (the 8-byte NIDS header is not shown):

| Message Type | Length | Sequence Number | Type | Data |
|---|---|---|---|---|
| ARU Testmode | 8 | 0 | 0x01 | Byte: 0 = None, 1 = Read, 2 = Create, 3 = Both. Unsigned Int: ARU port number |
| ARU Testmode Ack | 5 | 0 | 0x81 | None |
| ARU Beginning of Call | 5 | 1 | 0x02 | None |
| ARU Beginning of Call Ack | 5 | 1 | 0x82 | None |
| ARU End of Call | 5 | >1 | 0x03 | None |
| ARU End of Call Ack | 5 | Same | 0x83 | None |
| ARU Header Info | 15 | >1 | 0x04 | 10-byte character string containing ARU version. Left-justified, blank-filled, no terminating 0. Example "95.3.1" |
| ARU Header Info Ack | 5 | Same | 0x84 | None |
| ARU Logrec | >5 | >1 | 0x05 | ARU logfile record. See document "Application Log Detail Design" for formats. |
| ARU Logrec Ack | 5 | Same | 0x85 | None |
| ARU Transfer | 5 | >1 | 0x06 | None |
| ARU Transfer Ack | 5 | Same | 0x86 | None |
| Manual Console Testmode | 6 | 0 | 0x41 | Byte: 0 = None, 1 = Read, 2 = Create, 3 = Both |
| Manual Console Testmode Ack | 5 | 0 | 0xC1 | None |
| Manual Console Beginning of Call | 5 | 1 | 0x42 | None |
| Manual Console Beginning of Call Ack | 5 | 1 | 0xC2 | None |
| Manual Console End of Call | 5 | >1 | 0x43 | None |
| Manual Console End of Call Ack | 5 | Same | 0xC3 | None |
| Manual Console Header Info | 15 | >1 | 0x44 | Manual Console version. Left-justified, blank-filled, no terminating 0. Example: "macd420" |
| Manual Console Header Info Ack | 5 | Same | 0xC4 | None |
| Manual Console Logrec | >5 | >1 | 0x45 | Manual Console logfile record. See document "Application Log Detail Design" for formats. |
| Manual Console Logrec Ack | 5 | Same | 0xC5 | None |
| Manual Console Synch Notify | 5 | >1 | 0x46 | None |
| Manual Console Synch Notify Ack | 5 | Same | 0xC6 | None |
| Manual Console Synched | 5 | >1 | 0x47 | None |
| Manual Console Synched Ack | 5 | Same | 0xC7 | None |
| Manual Console State Query | 5 | >1 | 0x48 | None |
| Manual Console State Query Ack | 5 | Same | 0xC8 | None |
| Manual Console State Query Response | >5 | >1 | 0x49 | Manual Console logfile record. See document "Application Log Detail Design" for formats. |
| Manual Console State Query Response Ack | 5 | Same | 0xC9 | None |

7. Sequence Numbers

Sequence numbers are used in the messages as a means of detecting duplicate messages (a normal condition) and out-of-order messages (a program error). The first message sent for each test case starts as 1, and each new message increments the sequence number by one. An Ack message uses the same sequence number as the message being acked.

Testmode messages don't use sequence numbers (1) since they are asynchronous (i.e. processed immediately upon reception), and (2) so that the user can reboot a Test Driver or Test Object or move to a different one.

8. Sending and Receiving Messages

Each message is sent repeatedly until an Ack is received. Each message is sent 6 times in the first second (once every 0.2 seconds), then once per second thereafter. The initial burst during the first second prevents a large delay between sends if the first few sends are garbled or otherwise missed, but if a full second goes by without an Ack, a send is then done only once per second to decrease the amount of network traffic.

Once an Ack is received, the send of the next message is begun immediately. Because of this, the receiver must not Ack a message until it has verified that the message is valid.

The Manual Console sits in a loop during a send and doesn't do anything else, including process received messages, which means that while the Manual Console is sending it will not Ack received messages. If the Test Driver does the same thing, deadlock results. Therefore, the Test Driver must continue to process received messages while sending.

9. Synchronization

During an automated test, the Test Driver sends the same input to the Test Object that was entered by the user when the logfile was created. These inputs must be sent only when the Test Object is ready for them, otherwise the Test Object will discard them. Phone digits and voice are sent via phone line to the ARU. Keystrokes are sent via IP messages to the Manual Console.

9.1. Synchronization: ARU

A single ARU state, script number, is used by the Test Driver for synchronizing the ARU. The ARU sends an ARU Script Number record to the Test Driver each time the script number changes. In Create mode, the Test Driver writes this record to the output logfile. In Read/Create mode, the Test Driver reads this record from the input logfile and waits for the ARU to sends a matching record (if it hasn't already) before reading further from the input logfile.

9.2. Synchronization: Manual Console

Unlike the ARU, where synchronization is performed at the Test Drive using information sent by the ARU, the Manual Console performs its own synchronization using information sent by the Test Driver. The reason for this is largely historical (from the time when the Test Driver resided on the Manual Console), and synchronization could certainly be performed at the Test Driver for the Manual Console just as is done for the ARU. A large volume of network traffic would result, however, given the relatively large amount of information which comprise Manual Console state information.

The Manual Console states consist of Script Number, Colorkey Text, Answer Scai, and Window ID. In Create mode, the Manual Console sends changed state info to the Test Driver whenever the Manual Console receives input, the Test Driver saves this info in the output logfile. In Read/Create mode, the Test Driver sends this info back to the Manual Console, which synchronizes on it before accepting more records from the Test Driver. Note that the Test Driver sends the next record to the Manual Console regardless of whether the Manual Console is synchronized. It is up to the Manual Console not to process the record until the Manual Console is synchronized. In contrast, the Test Driver does not send anything else to the ARU until the Test Driver has determined that the ARU is synchronized.

Another important difference between Manual Console and ARU synchronization is that ARU synchronization uses every state encountered by the ARU, while Manual Console synchronization uses only those states that exist when a keystroke is processed. The ARU's is the better approach. Synching on every state is a better test, plus the Test Driver can stop the test as soon as a non-matching state is seen. On the Manual Console, because of its subset synching, neither it nor the Test Driver can know when a test is going to fail because of a state mismatch; the only recourse for the Test Drive is to time out the test.

10. Originator Disconnect

The Test Driver must synchronize with the Test Object for an originator disconnect in Read/Create mode. Since the ARU sends state info whenever it changes, the Test Driver needs no further information to determine when to disconnect from the ARU. For the Manual Console, the Test Driver must obtain the state of the Manual Console when the user disconnects in Create mode, and wait for the Manual Console to synchronize in Read/Create mode. In Create mode, the Test Driver obtains the Manual Console's state by sending a State Query message; the Manual Console sends back a State Query Response message which contains the Manual Console's state. In Read/Create mode, the Test Driver determines when the Manual Console is synchronized by sending a Synch Notify message; when the Manual Console is synchronized, it sends back a Synched message.

11. IP Sockets

The Test Objects and the Test Driver each receive messages at the following IP sockets:

| Component | Socket |
| --- | --- |
| Test Driver | 0x208f |
| Manual Console | 0x218f |
| ARU | 0x228f |

What is claimed is:

1. A system for testing telecommunication services coupled with a communications network comprising a switched network and an intelligent services network (ISN) platform, said system comprising:

an operator network center (ONC) within said intelligent services network platform, an automatic call distributer (ACD) coupled between the switched network and said operator network center;

an intelligent services network adjunct processor coupled to said ACD via a switch to computer application interface (SCAI) and coupled to said ONC via a wide area network;

a controller;

a test call generator coupled between said controller and the switched network, that generates test calls in the communications network; and a communicating means, coupled betweem saod controller and the ISN platform, for communicating between said controller and the ISN platform.

2. The system of claim 1, wherein said test call generator comprises:

a first in-band test set configured to function as a test call originator;

a second in-band test set configured to function as a test call terminator; and an out-of-band message generator configured to function as a test call originator and a test call terminator for out-of-band test calls.

3. The system of claim 1, wherein said test call generator comprises a sound generator for generating voice signals.

4. The system according to claim 1, wherein said communication means comprises a messaging system protocol.

5. The system according to claim 4, wherein said messaging system protocol includes a TESTMODE message used to cause the ARU to send unsolicated messages to said controller, said unsolicated messages pertaining to the progression of said test calls.

6. The system according to claim 1 further comprising:
a billing verification means, coupled to said controller and the switched network, for verifying billing records within the switched network.

7. The system of claim 1 comprising a means for sending keyboard input commands to the ISN element over the communication means whereby the ISN element may emulate a live operator typing keystrokes into the ISN element to provide appropriate responses to the test calls.

8. The system of claim 1 further comprising means for sending a message over the communication means prior to placement of a test call whereby the ISN element is placed in a testmode condition and whereby the ISN element operates to send unsolicited messages to the controller pertaining to the progression of the test call.

9. The system of claim 1 further comprising billing verification means coupled to the controller and the communications network for verifying billing records generated within the communication network.

* * * * *